US007667643B2

(12) United States Patent
Handermann et al.

(10) Patent No.: US 7,667,643 B2
(45) Date of Patent: Feb. 23, 2010

(54) MINIATURIZED SATELLITE TRANSCEIVER

(75) Inventors: Greg Handermann, Lovettsville, VA (US); Leslie Snively, Castle Rock, CO (US); Paul Ebert, Potomac, MD (US); James Mastropole, Great Falls, VA (US); Christopher Thorne, Columbia, MD (US); David Rampersad, Frederick, MD (US); Farhad Verahrami, North Potomac, MD (US)

(73) Assignee: Comtech Mobile Datacom Corporation, Germantown, MD (US)

( * ) Notice: Subject to any disclaimer, the term of this patent is extended or adjusted under 35 U.S.C. 154(b) by 190 days.

(21) Appl. No.: 11/685,936

(22) Filed: Mar. 14, 2007

(65) Prior Publication Data

US 2007/0216573 A1 Sep. 20, 2007

Related U.S. Application Data

(63) Continuation-in-part of application No. 11/592,008, filed on Nov. 2, 2006.

(60) Provisional application No. 60/782,151, filed on Mar. 14, 2006, provisional application No. 60/816,819, filed on Jun. 27, 2006, provisional application No. 60/733,268, filed on Nov. 2, 2005.

(51) Int. Cl.
*G01S 5/14* (2006.01)
(52) U.S. Cl. .............................. 342/357.1; 342/357.07; 342/357.09
(58) Field of Classification Search .............. 342/357.1, 342/357.07, 357.09
See application file for complete search history.

(56) References Cited

U.S. PATENT DOCUMENTS

| 4,649,396 | A | * | 3/1987 | Friedman .................... 343/705 |
| 5,835,069 | A | | 11/1998 | Skoog ......................... 343/765 |
| 5,872,777 | A | | 2/1999 | Brailean et al. ............. 370/349 |
| 6,121,922 | A | | 9/2000 | Mohan ..................... 342/357.1 |
| 6,163,681 | A | * | 12/2000 | Wright et al. ............... 455/66.1 |
| 6,353,730 | B1 | * | 3/2002 | Buettner et al. .............. 340/7.1 |

(Continued)

FOREIGN PATENT DOCUMENTS

DE 10 2004 016 548 10/2005

(Continued)

OTHER PUBLICATIONS

E. Franke, Choosing the best hardware form-factor for the airborne domain of the Joint Tactical Terminal (JTT) and Joint Tactical Radio System (JTRS), IEEE Military Communications Conference, vol. 1, p. 168-174, 2001.*

(Continued)

*Primary Examiner*—Thomas H Tarcza
*Assistant Examiner*—Fred H Mull
(74) *Attorney, Agent, or Firm*—Morgan, Lewis & Bockius LLP

(57) ABSTRACT

Described is a miniaturized satellite transceiver for communicating with a Global Positioning System (GPS) satellite and a communications satellite. The miniaturized satellite transceiver includes an integrated GPS receiver configured to receive communications from the GPS satellite, a satellite modem configured to transmit and receive communications from the communications satellite, and an operating system. The miniaturized satellite transceiver is installable in a handheld device, a mobile satellite transceiver system, or an inflight transceiver and locator system.

35 Claims, 6 Drawing Sheets

U.S. PATENT DOCUMENTS

| | | |
|---|---|---|
| 6,683,605 B1 | 1/2004 | Bi et al. .................... 345/211 |
| 6,799,094 B1* | 9/2004 | Vaida et al. ............ 342/357.07 |
| 7,006,032 B2* | 2/2006 | King et al. .................... 342/29 |
| 7,053,767 B2 | 5/2006 | Petite et al. ................. 340/531 |
| 7,131,136 B2 | 10/2006 | Monroe ...................... 725/105 |
| 7,236,778 B2* | 6/2007 | Schreiber ................... 455/423 |
| 2002/0089434 A1 | 7/2002 | Ghazarian ................... 340/988 |
| 2002/0173888 A1* | 11/2002 | Shelton et al. .............. 701/213 |
| 2002/0177476 A1* | 11/2002 | Chou .......................... 455/574 |
| 2004/0008253 A1* | 1/2004 | Monroe ...................... 348/143 |
| 2004/0029615 A1* | 2/2004 | Gerry et al. .............. 455/456.1 |
| 2004/0183673 A1* | 9/2004 | Nageli ................... 340/539.13 |
| 2004/0246104 A1 | 12/2004 | Baechtiger et al. ....... 340/10.41 |
| 2005/0038601 A1 | 2/2005 | Dentinger et al. ........... 701/213 |
| 2005/0060339 A1 | 3/2005 | McGee ....................... 707/102 |
| 2005/0076034 A1 | 4/2005 | Addonisio et al. ............ 707/10 |
| 2005/0143005 A1* | 6/2005 | Moore, III ................. 455/13.1 |
| 2006/0055561 A1* | 3/2006 | Kamali et al. ............... 340/936 |
| 2006/0141930 A1* | 6/2006 | Keen et al. ................. 455/12.1 |
| 2006/0187026 A1* | 8/2006 | Kochis ................... 340/539.13 |
| 2007/0130599 A1 | 6/2007 | Monroe ...................... 725/105 |
| 2007/0293149 A1* | 12/2007 | Wubker ...................... 455/13.2 |
| 2007/0298786 A1* | 12/2007 | Meyers et al. ............... 455/431 |

FOREIGN PATENT DOCUMENTS

EP             1 406 207           4/2004

OTHER PUBLICATIONS

R.C. Ormesher et al., Current radar—responsive tag development activities at Sandia National Laboratories, Proceedings of the SPIE, vol. 5410(1), p. 10-16, 2004.*

J. Summers, Plug and play testbed to enable responsive space missions, IEEE Aerospace Conference, p. 557-563, Mar 2005.*

R. Holm, Why convert to a SAASM-based Global Positioning System?, Military Embedded Systems, Oct. 2005.*

J. Harms, The Orbcomm Experience, EMPS 2004 6th European Workshop on Mobile/Personal Satcoms & ASMS 2004 2nd Advanced Satellite Mobile Systems Conference, Sep. 2004.*

* cited by examiner

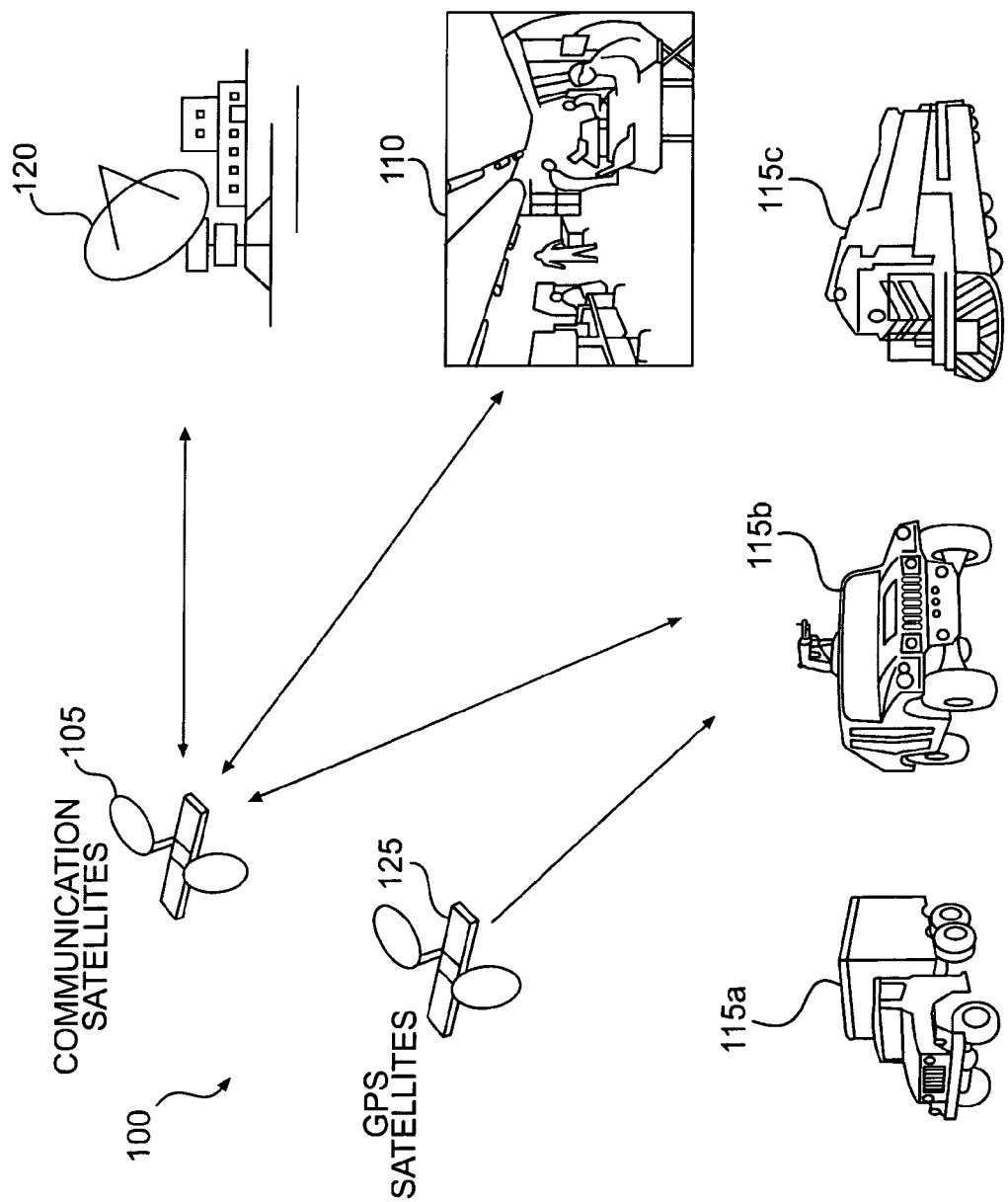

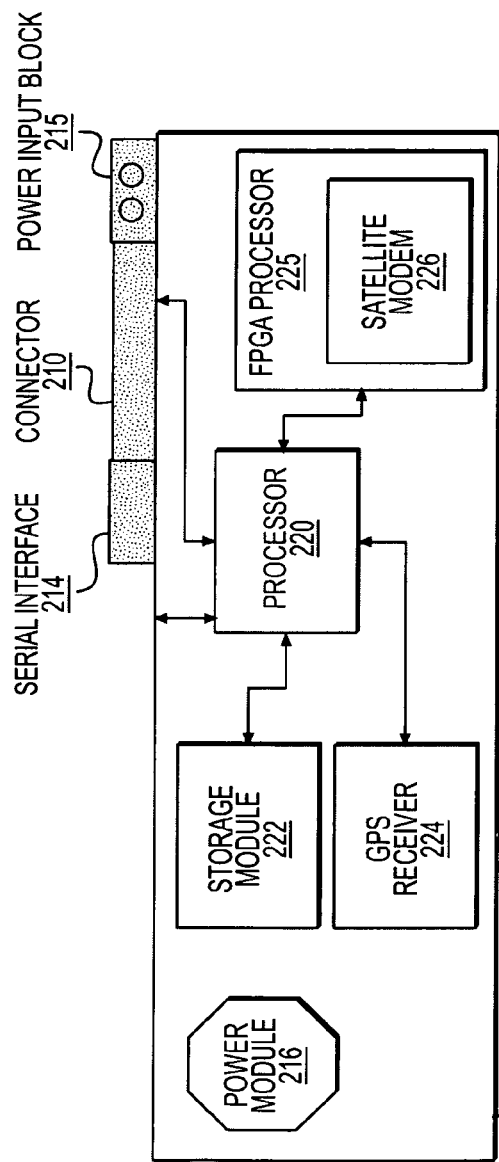
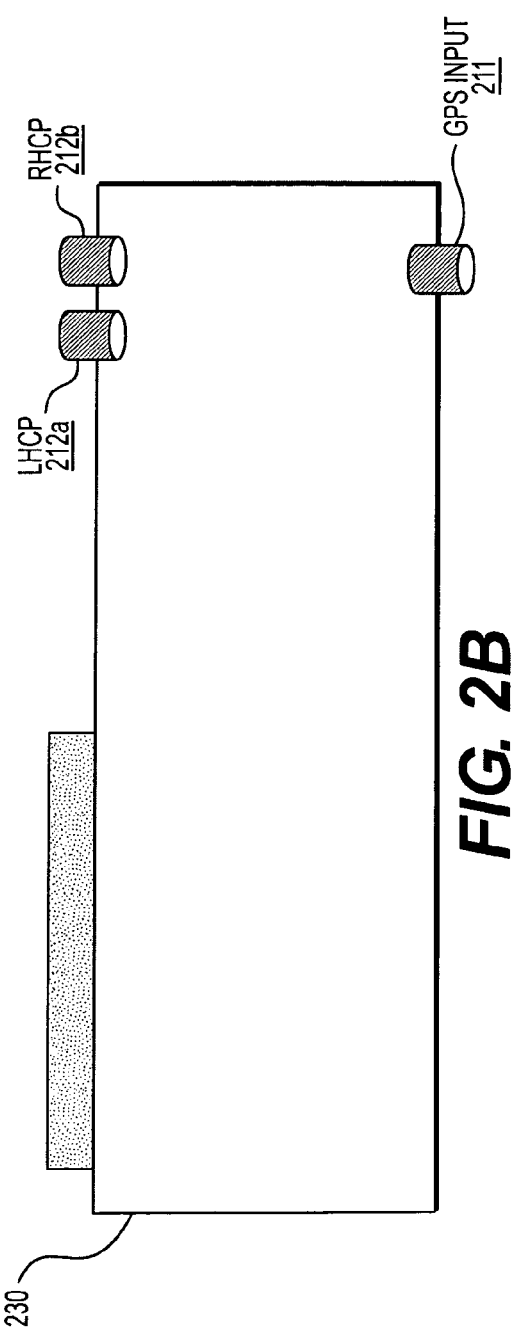
FIG. 2A
FIG. 2B

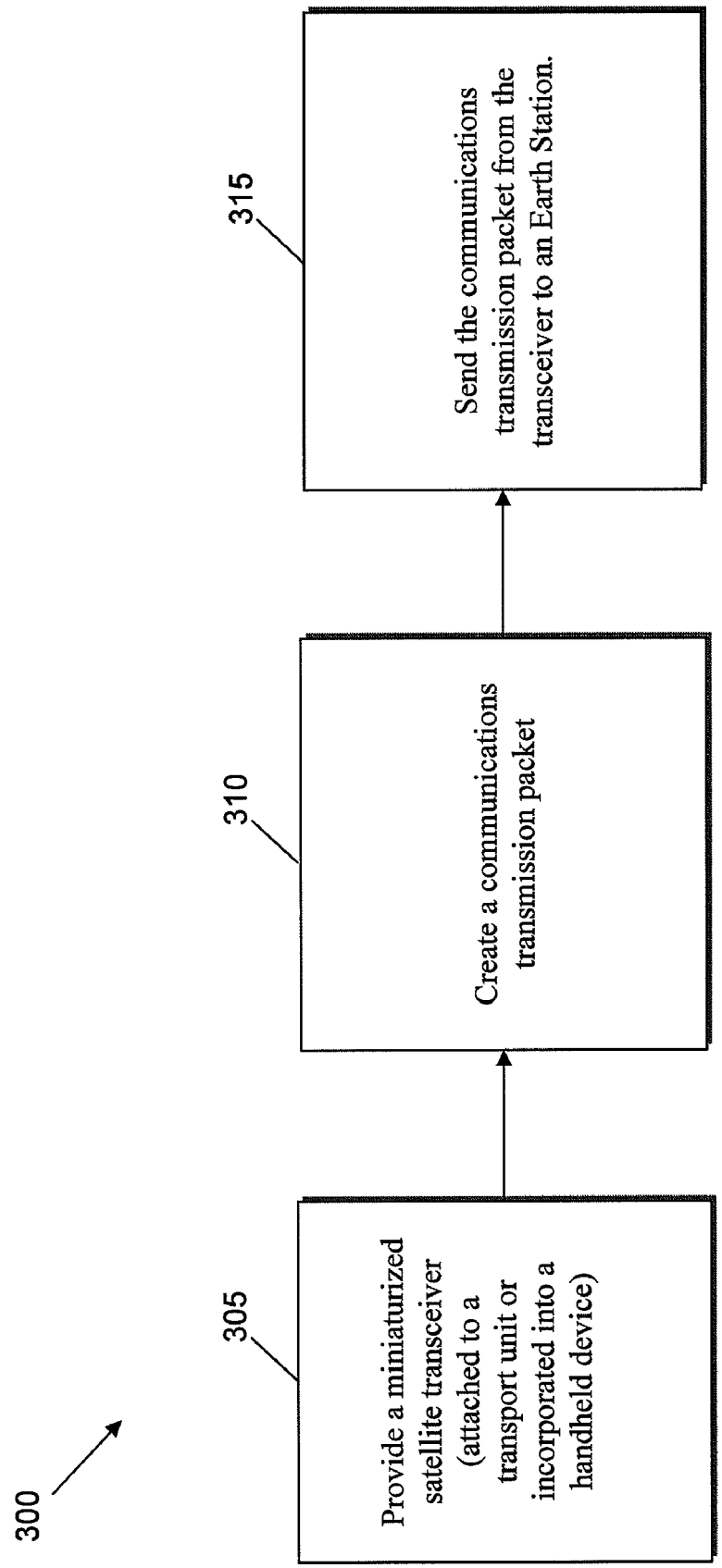

MINIATURIZED SATELLITE TRANSCEIVER

CROSS-REFERENCE TO RELATED APPLICATIONS

This application is a continuation-in-part of U.S. patent application Ser. No. 11/592,008 filed Nov. 2, 2006, which claims priority to and the benefit of provisional U.S. patent application No. 60/733,268, filed Nov. 2, 2005. In addition, this application claims priority to and the benefit of, and incorporates herein by reference in their entirety, provisional U.S. patent application Ser. No. 60/782,151 filed Mar. 14, 2006 and provisional U.S. patent application No. 60/816,819 filed Jun. 27, 2006.

TECHNICAL FIELD

The present invention relates generally to satellite transceiver systems and specifically to miniaturized satellite transceivers.

BACKGROUND

The increased mobility of individuals, transports, and supplies has been accompanied with an increase in the value of the knowledge regarding the location of the individuals, transports, and supplies. Devices that receive signals from Global Positioning System (GPS) satellites are generally available to members of the public. The GPS receivers generally inform the individual holding the unit of his location on Earth, but these GPS receivers do not typically transmit the location of the individual. Thus, the coordinates are useful to the individual, but not to someone that wants to find the individual.

Systems used by the armed forces for transporting goods, supplies, and materials (e.g., logistic systems) may have access to radio transmitters to report the location of vehicles and/or units to headquarters. When manually coupled with a GPS receiver, an individual in a unit can inform headquarters of his or her position by orally relaying the coordinates via radio.

Similarly, corporations may have systems in place to track cargo transports. The transports can manually report location information to a corporate operations center or they may utilize point-of-reception reporting. The point-of-reception reporting includes updating the location of a good or supply when the item is processed by an intermediate facility.

Since mobility is increasing, it is important for individuals, the military, and corporations to be able to track and report the location and status of vehicles, individuals, and cargo back to others. The size of the separate components of the communication system, however, and the awkwardness of the manual combination of the components by an operator, make it infeasible to efficiently utilize GPS technology to track and transmit locations and status information back to others. These technologies lack a unified arrangement of the separate components that maximizes and incorporates each of their respective functionalities while simultaneously reducing the space required to carry or incorporate them.

SUMMARY OF THE INVENTION

Though GPS receivers and transmitters are useful for determining and reporting the location of a vehicle, they are not generally useful for further communications, e.g., reporting vehicle status, operator status, or if cargo has been delivered, lost and/or damaged. The present invention addresses shortcomings of the prior art.

In one implementation, there is a miniaturized satellite transceiver for communicating with a Global Positioning System satellite and a communications satellite. The miniaturized satellite transceiver includes an integrated Global Positioning System (GPS) receiver configured to receive communications from the GPS satellite, a satellite modem configured to transmit and receive communications from the communications satellite, and an operating system for controlling the operation of the GPS receiver and the satellite modem. Beneficially, the communications sent from the miniaturized satellite transceiver can include GPS information received from the GPS satellite such as the GPS coordinates and/or location of the miniaturized satellite transceiver. Though reference is made herein to communicating with a single GPS satellite, often communications with multiple GPS satellites are required to determine a receiver's location. Therefore, references made herein referring to communicating with a single GPS satellite are understood to include communications with one or more GPS satellites.

In some implementations, there is a method for communicating between a transport unit and an Earth station via a communications satellite. The method includes begins by providing a miniaturized satellite transceiver. The miniaturized satellite transceiver typically includes an integrated GPS receiver configured to receive communications from a GPS satellite, a satellite modem configured to transmit and receive communications from the communications satellite, and an operating system for controlling the operation of the GPS receiver and the satellite modem. The method also involves creating, by the operating system, a communications transmission packet. The communications packet is sent, via the satellite modem, to the communications satellite. The communications packet is then sent from the communications satellite to the Earth station.

In some versions, the miniaturized satellite transceiver is installable in a handheld device, thereby providing location, status, and/or reporting capabilities to an individual, such as a soldier, in a small form factor that is easily portable. In some implementations, the miniaturized satellite transceiver is installable in a mobile satellite transceiver system and/or an in-flight transceiver and locator system for providing location, status, and/or reporting capabilities for a vehicle such as a transport truck or a helicopter, respectively.

In some implementations, a mobile satellite transceiver system that incorporates a miniaturized satellite transceiver is used for communicating with a Global Positioning System (GPS) satellite and a communications satellite. The miniaturized satellite transceiver includes a GPS receiver configured to receive communications from the GPS satellite, a satellite modem configured to transmit and receive communications from the communications satellite, and an operating system for controlling the GPS receiver and the satellite modem. In some implementations, the operating system of the mobile satellite transceiver system is configured to send and receive text messages to/from the communications satellite via the satellite modem and to communicate with the miniaturized satellite transceiver. Typically, the mobile satellite transceiver system is attached to a vehicle (e.g., a truck or transport vehicle) via screws or a magnetic mounting bracket, thus providing the transport with position and status reporting capabilities. In some versions of the mobile satellite transceiver system, an RFID interrogator is coupled to or incorporated into the mobile transceiver system. In these embodiments, a communications packet transmitted from the miniaturized satellite transceiver optionally includes RFID data. The RFID data includes, for example, the presence of a particular RFID tag in the area interrogated by the RFID interrogator. In some implementations of the mobile satellite transceiver system, the GPS receiver of the miniaturized satellite transceiver is not utilized and instead an additional Ground-Based GPS Receiver Application Module (GB-GRAM) with a Selective Availability Anti-Spoofing Module (SAASM) communicates with GPS satellites. Some versions of the mobile satellite transceiver system additionally provide a memory buffer of at least 512 kilobytes.

In some implementations, an in-flight transceiver system that incorporates the miniaturized satellite transceiver allows for communicating information securely at a high data rate between an in-flight unit and a ground unit. The in-flight transceiver system includes an antenna, a miniaturized satellite transceiver housed in an aviation box conforming to a one-half, half short Air Transport Rack (ATR) form factor, and a switch between the aviation box and the antenna for controlling a data signal between the antenna and the miniaturized satellite transceiver. In some implementations, the miniaturized satellite transceiver includes an integrated GPS receiver configured to receive communications from the GPS satellite, a satellite modem configured to transmit and receive communications from the communications satellite, and an operating system. In some versions, the in-flight transceiver system further includes a signal booster between the aviation box and the antenna. In some implementations, the antenna is located outside a body of an aviation platform (e.g., the body of an aircraft) and the aviation box is located inside the body of the aviation platform. In some versions, the antenna is fin-shaped. In some implementations the antenna is a dual-pole antenna and/or is an omni-directional antenna. The information is, for example, communicated bidirectionally between the in-flight unit and the ground unit. In some implementations, the miniaturized satellite transceiver is assigned unique radio identifier, and there is a customizable node name is associated with the unique radio identifier.

Any implementations of the miniaturized satellite transceiver (or mobile satellite transceiver systems or in-flight transceiver and locator systems that incorporate the miniaturized satellite transceiver) are operable using L-Band communications channels such as MSAT, INMARSAT, Thuraya, Artemis, ACeS, and/or OPTUS, or any combination thereof, thereby providing communications beyond-line-of-sight. Beneficially, some versions of the miniaturized satellite transceiver also include a Left-Hand Circular Polarized antenna connection and a Right-Hand Circular Polarized antenna connection for receiving and/or sending communication-bearing signals with the respective polarizations.

Communications sent from and received by the miniaturized satellite transceiver typically include: the location of the miniaturized satellite transceiver based on Global Positioning System (GPS) coordinates received from GPS satellites, text messages, Voice over Packet (VoP) communications, and/or RFID data (where a RFID interrogator is provided). Beneficially, the communications may also be location data, maps, photos, video, task orders, targeting data, computer programs, software, cryptographic keys, provisioning files, and/or other communications. Advantageously, the miniaturized satellite transceiver transmits data and receives data at rates between 660 bits per second ("bps") and about 21,000 bps, while consuming as low as 6.5 volts direct current. Typically the communications are controlled by the miniaturized satellite transceiver's operating system, and communications are sent to and received from the communications satellite via the miniaturized satellite transceiver's satellite modem.

In some implementations of the miniaturized satellite transceiver (or mobile satellite transceiver systems or in-flight transceiver and locator systems that incorporate the miniaturized satellite transceiver), the miniaturized satellite transceiver is Blue Force Tracking capable, e.g., data communications are sent over a Blue Force Tracking network. Beneficially, some of these implementations are operable to send and receive Voice over Packet transmissions over Blue Force Tracking satellite channels via the satellite modem of the miniaturized satellite transceiver. In some aspects, transmissions and received signals are encrypted using Triple Data Encryption Standard (DES) algorithms, Advanced Encryption Standard (AES) algorithms, and/or Rivest Shamir Adleman (RSA) algorithms.

Any of the implementations, aspects, and examples above can provide one or more of the following advantages. One advantage of the miniaturized satellite transceiver is that portability is improved because the transceiver integrates both a GPS receiver and the miniaturized satellite transceiver into a single unit. For an individual, a single handheld unit provides the functionality previously obtained requiring multiple separate devices. For vehicles, system efficiency is improved by reducing the number of communications devices while simultaneously reducing the footprint required by the communications devices.

Another advantage of the miniaturized satellite transceiver is reception sensitivity is increased, and multiple forms of signal reception, e.g., GPS, satellite communications over RHCP and/or LHCP antennas, are provided. Yet another advantage of the miniaturized satellite transceiver is the transceiver can easily be integrated into networked messaging systems allowing for real-time or near real-time communications between units (e.g., individuals or transport units) in the field and headquarters or operations centers. Another advantage of the miniaturized satellite transceiver is produceability can be improved (e.g., the transceiver is more cost-effective and cheaper to manufacture).

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which:

FIG. 1A depicts a messaging system for communicating between headquarters, transports, and network management centers, via satellites;

FIGS. 2A and 2B depict a miniaturized satellite transceiver used in some implementations of the systems of FIGS. 1A and 1B;

FIG. 3 depicts a method for communicating between a transport unit and an Earth station via a communications satellite;

DETAILED DESCRIPTION

Figure 1B:
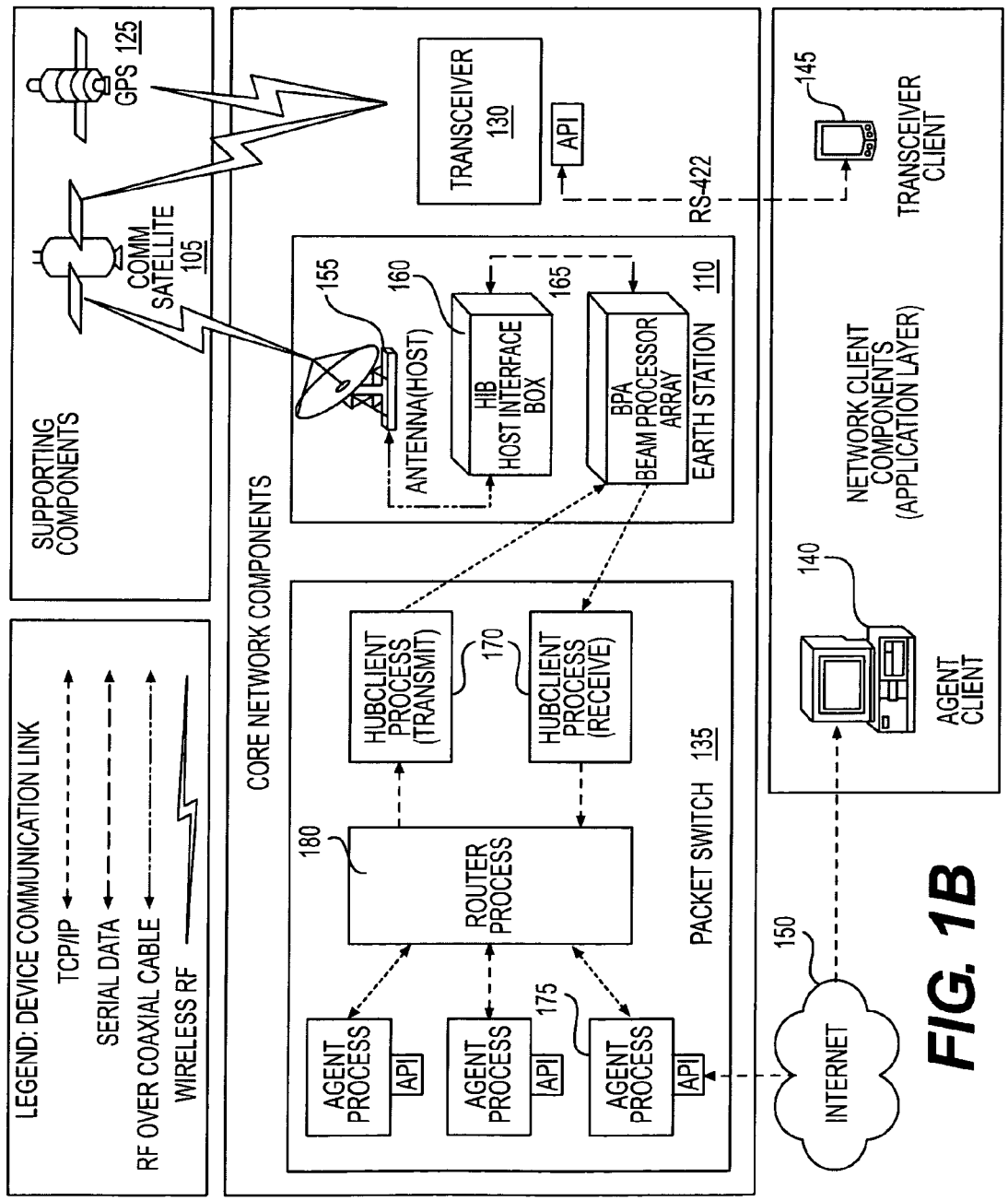
FIG. 1B depicts an alternate implementation of the messaging system of FIG. 1A that includes a miniaturized satellite transceiver.

The miniaturized satellite transceiver described herein can be incorporated into a networked messaging system that can send messages over the Internet and/or via satellite communications channels. The miniaturized satellite transceiver includes a satellite modem to communicate with communications satellites in Earth's orbit. The miniaturized satellite transceiver also includes a GPS receiver on-board the transceiver, so no additional and/or separate GPS modules are typically necessary. The miniaturized satellite transceiver can be installed in hand held devices, but alternatively, the miniaturized satellite modem can be incorporated into mobile satellite transceiver systems and/or in-flight transceiver and locator systems.

Implementations of a messaging system that incorporates the miniaturized satellite transceiver provide near real-time communication services via satellite between a transceiver (be it handheld or connected/attached to a vehicle) and a ground unit. The ground unit can, for example, be an "Earth station" or "headquarters." In other examples, the ground unit can be any ground, sea, and/or air-based unit. Advantageously, the near real-time communications include, but are not limited to, position reporting, vehicle status, operator status, cargo status, voice over packet communications, and/or text-messaging. To determine the position of the miniaturized satellite transceiver, it typically incorporates commercial-grade GPS capabilities and antenna(s). Beneficially, for military applications or general data security, some implementations also provide built-in encryption mechanisms to secure communications sent between the vehicle or handheld device and headquarters. By incorporating encryption into the device, as opposed to using an external encryption device or module, the overall space used on a vehicle or handheld device (i.e., the "footprint") is reduced. For individuals such as an armed forces soldier, it is especially beneficial to carry one device that does the work of two to reduce the communications equipment, and correspondingly the weight, the individual must carry.

Several enclosure embodiments exist for the miniaturized satellite transceiver. The miniaturized satellite transceiver can, for example, be housed within a clamshell metal housing to shield the transceiver from Radio Frequency (RF) interference. Alternatively the miniaturized satellite transceiver can be housed with a metal or plastic housing designed to withstand the rigors of battlefield use usually with additional components (e.g., an RFID interrogator). In some embodiments, the miniaturized satellite transceiver is housed in an aviation box mounted in an aircraft, typically occupying no more than a one-half short ATR form factor (approximately six (6) inches). A description of how a miniaturized satellite transceiver is utilized in a messaging system is illustrative.

FIG. 1A depicts a messaging system 100 that incorporates the miniaturized satellite transceiver (not shown) described herein for communicating (via communications satellites 105) between Earth stations 110, transports 115a, 115b, and 115c (generally 115) fitted with communications systems that incorporate the miniaturized satellite transceiver, and network management centers 120. Earth stations 110, such as military bases, bases of operations, outposts, corporate operations centers, or the like send communications to the communications satellites 105, which then send communications to the transports 115. The Earth stations 110 send communication signals (intended for transports 115 or network management centers 120) to communication satellite units 105 using standard communications channels, e.g., an L-Band communications channel. In some implementations, communications to and from the satellite 105 are encrypted using commercial and/or government approved encryption schemes such as Triple Data Encryption Standard (DES) algorithms, Advanced Encryption Standard (AES) algorithms, and/or Rivest Shamir Adleman (RSA) algorithms.

The satellite 105 sends the communication signals down to the intended targets, e.g., commercial transport trucks 115a, personnel carriers 115b, trains 115c, air vehicles (not shown) and/or sea vehicles (not shown) and/or network management centers 120, where the communication signals are received by the miniaturized satellite transceiver (e.g., in a handheld unit carried by an individual, incorporated into a mobile satellite transceiver system attached to the vehicle, or incorporated into an in-flight transceiver and locator system). In the case of transports 115, communication signals sent from the transports 115 back to the communications satellites 105 include, but are not limited to, GPS position reports, text messages, Voice over Packet, and/or RFID tag information, location data, maps, photos, video, task orders, targeting data, computer programs, software, cryptographic keys, provisioning files, and/or other communications. GPS information identifying the location, speed, trajectory, etc., of the transports 115 is received from GPS satellites 125 via the miniaturized satellite transceiver. In some implementations, communications between the communications satellites 105 and the Earth stations 110 are sent directly to the Earth stations 110. In other implementations, these communications are sent to network management centers 120 first, which in turn send the communications to Earth stations 110 using commercial satellites or using conventional networking technologies, e.g., Ethernet, T1 "land lines."

FIG. 1B shows another implementation of the communication system 100. The primary components in FIG. 1B are the miniaturized satellite transceiver 130, GPS satellites 125, a communications satellite 105, an Earth station 110, a packet switch network 135, and an agent application 140. The miniaturized satellite transceiver 130 is small enough to be portable and provides a built-in satellite modem, GPS receiver, and operating system for controlling the operation of the GPS receiver and the satellite modem. The miniaturized satellite transceiver 130 is typically incorporated into a hand-held device, mobile satellite transceiver system, an in-flight transceiver and locator system, or other transceiver system attached to or incorporated into a vehicle. Advantageously, due to the small size of the miniaturized satellite transceiver and the standard connections provided by the miniaturized satellite transceiver, e.g., connection and/or serial (described below), the messaging system 100 can incorporate and interact with the miniaturized satellite transceiver 130 easily depending on the client's communications needs.

In FIGS. 1A and 1B, the miniaturized satellite transceiver 130 provides mobile and/or fixed-remote access to the messaging system 100 network. The Global Positioning System includes a satellite "constellation" 125 that provides location signals to the GPS receivers of the miniaturized satellite transceiver 130. The messaging system 100 also includes a communications satellite 105 that provides a Radio Frequency (RF) communications relay between remote miniaturized satellite transceivers 130 and Earth stations 110. The Earth station 110 includes antennas and collocated hardware that handle the RF communication between the packet switch 135 and a particular communications satellite 105. The packet switch 135 is a computer cluster that provides the central message routing and delivery functionality, allowing network clients to communicate. Agent client applications 140 are peripheral customer applications that connect to the messaging system 100 network (via the packet switch 135) to locate or communicate with other network clients (e.g., the miniaturized satellite transceiver 130 and/or client applications 145 in signal communication with the miniaturized satellite transceiver 130). The transceiver client applications 145 are peripheral devices (and related software) that connect to the messaging system 100 via the miniaturized satellite transceiver 130 to locate or communicate with other network clients (agent clients 140 and/or other transceiver clients 145). In some implementations, the miniaturized satellite transceiver 130 is installed into the transceiver client 145 (e.g., a hand-held device, a phone, a personal digital assistant (PDA)).

In some examples, the messaging system 100 uses satellite technology for both mobile/remote communication and for location tracking. Another advantage of the miniaturized satellite transceiver is that the messaging system 100 is a service platform for two major types of applications: Supervisory Control and Data Acquisition (SCADA) and mobile messaging and location tracking.

SCADA systems are generally used to monitor and/or control remote facilities. For example, a metropolitan water and sewer utility can use a SCADA application to centrally monitor conditions (e.g., water levels in remote storage tanks, flow rates at key points in a pipeline, etc.) or to control equipment (e.g., remotely operate a series of valves). In some examples, the messaging system 100 and miniaturized transceiver 130 are particularly well suited to provide the communication linkage for remote SCADA locations that are not served by traditional telecommunications facilities. Central locations (such as headquarters or data centers) can access the messaging system 100 over the Internet 150 to communicate with remote locations. An advantage of the miniaturized satellite transceiver is that locations not served by existing telecommunication facilities can be remotely monitored and/or controlled.

The messaging system 100 is also useful for mobile messaging and location tracking. Many mobile applications require both a data exchange capability and a location tracking capability. The messaging system 100 allows a customer, such as a trucking company, to establish a private communication network that links each vehicle (or shipping container) with a central dispatch center to establish and provide a cryptographically isolated communication network. The message capability can be used for dispatch, delivery tracking, emergency alerts, etc. The GPS capability allows up-to-the-minute location tracking for each vehicle.

Some implementations of the miniaturized satellite transceiver 130 include a commercial-grade GPS receiver. Beneficially, the miniaturized satellite transceiver 130 includes commercial grade GPS capabilities "on board" and thus a separate GPS receiver component is not necessary. A GPS receiver within view of at least three GPS satellites can determine its ground position to within 30 meters. With four satellites, the GPS receiver can also determine altitude, speed, and direction of travel (i.e., course over ground). Advantageously, this GPS information can then be transmitted via the miniaturized satellite transceiver's satellite modem to a satellite for relay back to an Earth station 110.

Alternative implementations of the miniaturized satellite transceiver 130 provide a variety of configuration options with respect to automatic GPS reporting. One option causes the miniaturized satellite transceiver 130 to autonomously transmit GPS information to the packet switch 135 at a regular interval. This allows the miniaturized satellite transceiver 130 to act as a tracking device for the messaging system 100, regardless of whether a transceiver client 145 is involved. Additional options allow a transceiver client 145 to retrieve current GPS data. Some options allow the client application to show the current location on a map provided by mapping software installed on the transceiver client 145. In some implementations, some implementations are in signal communication with a military-grade GPS module, allowing for greater location-determining precision. In these implementations, the miniaturized satellite transceiver 130 is used in conjunction with, and interfaces with a transceiver client 145 that includes a military-grade GPS receiver.

The scalable design of the messaging system 100 architecture allows a single network to support multiple user groups. In some versions, the messaging system 100 network configuration segregates each of the user groups that coexist on a network, thereby creating a Virtual Private Network (VPN) for each group. Examples of user groups include a collection of Agent client applications 140 and associated miniaturized satellite transceivers 130 that operate within the confines of a VPN. A user group can, for example, represent (for military applications) a squad, platoon, or other grouping of soldiers. In business scenarios, a user group can represent a particular business customer. A user group also represents, however, in some instances, a separate functional division within a customer's organization. The messaging system 100 uses a combination of encryption, address ("node") scheme configuration, and packet switch 135 process organization to form and secure each VPN.

In other examples, the messaging system 100 advantageously provides a flexible addressing scheme for VPNs. The messaging system 100 uses an address abstraction scheme to control message delivery within a VPN. This scheme is based on a collection of named delivery targets known as nodes. Nodes are pre-defined as part of the messaging system 100 configuration and provisioning. At run-time, the messaging system 100 associates a node to one or more actual network elements (agent clients 140, mobile satellite transceiver systems, or miniaturized satellite transceivers 130) based on a combination of configuration and real-time events. Each messaging system message is addressed to a specific node (determined by its sender). The messaging system 100 delivers the message to all network elements currently associated with the specified node. This scheme provides a great deal of address flexibility. Node configuration schemes can be creatively constructed to provide individual element addresses as well as broadcast or multicast groups.

In some examples, the messaging system 100 advantageously delivers messages in "Datagram mode." In this mode, the sender receives no confirmation that a message has been received. This reduces the data sent back and forth between sender and recipient, thereby reducing traffic on the messaging system 100. For messages transmitted from an agent client 140 to the miniaturized satellite transceiver 130, the messaging system 100 also supports "reliable mode." In reliable mode, the packet switch 135 transmits a message repeatedly until the message is received and acknowledged by the transceiver 130 (or until the retry limit is exhausted). The sending agent client 140 receives explicit notification of message success or failure. While this increases traffic on the messaging system 100, this ensures that the message sent was received, thereby increasing the trustworthiness that a message got through.

In another embodiment, the miniaturized satellite transceiver 130 is Blue Force Tracking-capable. Blue Force Tracking is a communications system linking satellites, sensors, vehicles, and weapons into a single, seamless, digital network system. In some of these embodiments, voice messages are sent over the Blue Force tracking network. The voice messages are sent in packet form, for example as Voice over Packet (VoP) transmissions. In some implementations the voice packets are sent and received on a different channel than other data messages, e.g., GPS and text messages are sent over an INMARSAT channel while VoP transmissions are sent over a Thuraya channel.

In some embodiments, the data messages are also sent in packet form over the Blue Force Tracking-capable miniaturized satellite transceiver 130. In implementations where dedicated voice channels are utilized, beneficially, when the miniaturized satellite transceiver 130 detects that a voice message is to be sent, the satellite modem within the miniaturized satellite transceiver 130 ceases communications over the general data channel, transmits the voice communications over the dedicated voice channel, and then resumes communications over the general data channel once the voice communication has been transmitted and/or received. In some implementations, VoP communications sent via the Blue Force Tracking network are processed by a dedicated VoP processor (not shown) in signal communication with the miniaturized satellite transceiver 130. Beneficially, implementations with VoP provide beyond line of site voice communications within approximately five and a half (5.5) seconds. Typically this includes a half second of voice data per packet, a half second of transmit time per packet, a network delay of approximately 3.5 seconds, and a half second of processing at the ground station once the packet is received.

In another example, the messaging system 100 uses three key technologies to secure network data communication: Digital Spread Spectrum and CDMA technology, customer-level data encryption, and a network firewall. Combined, these mechanisms essentially create a VPN that protects the communication between a customer's agents 140 and transceivers 130.

In some examples, the messaging system 100 uses Digital Spread Spectrum Code Division Multiple Access (DSS-CDMA) for all radio communications between transceivers 130, communications satellites 105, and earth stations 110. These methodologies are designed to insure secure and reliable radio communications. In one implementation, the digital message content is combined with deliberate "noise" data and transmitted in a "burst" of bits that are spread over a range of frequencies. This implementation is typically more secure than other implementations. In another implementation, the digital message content is combined with deliberate noise data and transmitted using a fixed data sequence. This implementation is typically more cost-effective to implement and is more reliable. In both implementations, and others, the data is encrypted using a pseudo-random algorithm and a key. Each transmission typically lasts less than four hundred milliseconds, and appears as random static to most radio receivers. The receiving device is equipped with a matching algorithm and key, allowing it to detect the transmission and reassemble the original content. In some examples, encryption schemes such as Triple Data Encryption Standard (DES) algorithms, Advanced Encryption Standard (AES) algorithms, and/or Rivest Shamir Adleman (RSA) algorithms, are used to further secure communications.

The DSS-CDMA methodology makes the transmission extremely difficult to detect (known as Low Probability of Detection or "LPD"). Even if a transmission is detected and captured, it is even more difficult to decode the message content (known as Low Probability of Interception or "LPI"). DSS communication is also much less subject to RF noise or signal jamming. This provides a very high level of security and reliability for the satellite communications segment of the messaging system 100 network.

The messaging system 100 also applies internal encryption to message content to create customer-level data encryption. Separate key sets are used for each user group (or VPN). This further reinforces the internal separation of customers' proprietary information within the messaging system 100 network. The miniaturized satellite transceiver 130 encrypts message content before transmitting and decrypts the contents after receiving. The packet switch 135 performs a similar function at the point that it communicates with an agent client application 140. This approach further insures privacy between various customers being served by a particular packet switch 135. The customer-level data encryption also hides customer message content from network operations staff.

In other examples, the messaging system 100 uses a network firewall to increase protection. The packet switch 135 uses a standard network firewall to protect against unauthorized external access. The firewall is configured to allow access only to pre-defined agent client applications 140.

In some examples, an Earth station 110 handles the RF communication between the packet switch 135 and a particular communication satellite 105. The Earth station 110 includes a satellite dish 155 and collocated electronic components (a host-interface box or "HIB" 160 and a beam processor array or "BPA" 165). Combined, these components perform translation between the RF communications used by the communications satellite 105 and the traditional network communications used by the packet switch 135. In essence, an Earth station 110 serves as the packet switch's 135 satellite modem. In some implementations, an Earth station 110 serves as a transmitter, a receiver, and/or both. Often Earth stations 110 are dedicated to a particular role. Transmitting stations generally require an operating license and are subject to restrictions with regard to local geography and population density. As a result, transmitting dishes are typically located in remote, sparsely populated areas. Transmitting dishes are usually owned and operated by the satellite service vendor. Vendors also normally provide collocation space for the beam processor array (BPA) 165 and host interface box (HIB) 155 components.

Beneficially, however, receiver stations do not require licensing and are subject to little or no legal restrictions from the Federal Communication Commission. The receivers can be placed almost anywhere that has an unobstructed view of the target communications satellite 105. As a result, receiving Earth stations 110 can be fully owned and operated by an operator of the messaging system 100 or an autonomous customer.

As described herein, several components make up an Earth station 110: the antenna 155, the HIB 160, and the BPA 165. The antenna 155 (commonly referred to as "the host") is the satellite dish that handles direct radio communication with a specific communications satellite 105. Depending on its role, e.g., transmitter, a receiver, or both, the host 155 usually includes additional electronics such as signal amplifiers (for transmitters), RF noise filters (for receivers), and frequency converters (for transmitters and receivers). A transmitting host 155 takes the RF signal from the HIB 160 and transmits it toward the communications satellite 105. A receiving host 155 captures the satellite's 105 radio transmission and delivers it to the HIB 160.

The HIB 160 links the BPA 165 components to the host 155. The HIB 160 consists of an array of electronic and RF components, in some implementations assembled into a single chassis. The primary electronic function of the HIB 160 is to perform the conversion between the digitized DSS-CDMA serial data stream used by the BPA 165 and the analog RF signal format used by both the host 155 and the communications satellite 105.

From an architectural perspective, the HIB 160 also serves as a "host adapter" (as its name implies). It insulates the standardized interface of the BPA 165 from the potential variation of the host 155 interfaces. Implementations of the HIB 160 are compatible with most standard host 155 interfaces. When the messaging system 100 is adapted to a new type of host interface, however, advantageously the HIB's electronic composition can be adjusted to meet the requirements. The physical composition of the HIB 160 varies depending on the number of communication satellites 105 and/or "beams" (coverage areas) being served by the Earth station 110. It also varies based on the station's role as a transmitter or receiver.

The BPA 165 is a collection of processing modules (known as beam processors) that provide the satellite modem functionality within the Earth station 110. The "array" is basically a chassis containing one or more independent beam processors. The beam processors of the array 165 serve as the link between the packet switch 135 and the HIB 160 on behalf of a specific satellite beam. The beam processors perform the conversion between the TCP/IP packet data format used by the packet switch 135 and digitized DSS-CDMA serial data stream used by the HIB 160. In essence, it is the satellite modem for a particular beam. A beam processor can be configured as a transmitter, as a receiver, or as both (dual-mode). The transmitter functionality and the receiver functionality operate as separate, independent processing channels (even if a beam processor is used in dual mode). The composition of the Beam Processor Array 165 varies depending on the number of beams being serviced by the Earth station 110, the role of the Earth station 110 as a transmitter and/or receiver, and the hardware redundancy plan for the array 165.

The packet switch 135 forms the central core of the messaging system 100 network. In some examples, the packet switch 135 consists of one or more networked computers that run a Unix operating system (e.g., FreeBSD). Logically, the packet switch 135 comprises a set of distributed processes and configuration stores.

The packet switch 135 communicates with Earth stations 110 to perform message exchange with transceivers 130 (and associated transceiver clients 145). The packet switch 135 also provides the agent API and serves as the host for all agent client application 140 sessions. The packet switch 135, in some versions, serves as a master network router, accepting messages from senders and delivering them to the intended recipient(s). The primary functionality of the packet switch resides in three types of component processes: hub-client 170, agent 175, and router 180. These processes communicate with each other and with other network components using TCP/IP connections. This architecture allows the processes to be distributed across the machines that form the packet switch 135, thereby providing maximum scalability.

The HubClient Process ("HubClient") 170 is the packet switch's Earth station 110 interface process. It handles the communications between the packet switch 135 and a particular beam processor within the BPA 165 of an Earth station 110. In some versions, the packet switch 135 operates a separate instance of the HubClient process 170 for each beam processor channel (transmitting or receiving). This means that a particular HubClient 170 instance assumes a role as either a receiver or a transmitter. Each transmitter HubClient 170 accepts outbound messages from the router process 180 and relays them to its associated beam processor for translation and satellite transmission. Each receiver HubClient accepts inbound messages from its associated beam processor and relays them to the router process 180.

The agent process 175 is the packet switch's customer-facing subcomponent. The agent processes host the agent's API, serving as the gateway between a customer's business applications (agent clients 140) and the messaging system 100 network. Among other abilities, this allows an agent client 140 to track and exchange messages with its related transceivers 130.

From an architectural perspective, an agent process 175 also serves as the anchor point for its designated user group or VPN. Consequently, the packet switch 135 runs a separate instance of the agent process 175 for each distinct user group. The configuration of a particular agent process 175 defines the scope and membership of its related VPN.

An agent process 175 can host API connections (or agent client 140 sessions) for multiple agent clients 140. This gives the customer the option of dedicating agent clients 140 to specific functions within the VPN (such as dispatch, GPS tracking, general message exchange, etc.). An agent process 175 is also responsible for central message processing within the VPN. This includes encryption/decryption for the agent client 140 sessions. The agent process 175 communicates with the router process 180 to receive inbound messages from the miniaturized satellite transceiver 130 and to send outbound messages to the miniaturized satellite transceiver 130. The agent process 175 also serves as an intermediary for transceiver-to-transceiver messages within a VPN.

The router process handles message routing between agent processes 175 and the HubClient processes 170. Conventionally, the router process 180 is a single process on the packet switch 135. However, for scalability, the messaging system 100 architecture allows multiple router processes 180 to work in concert to form a distributed virtual router. The router processes relay outbound messages received from agent processes to the appropriate HubClient(s) 170 for transmission over the appropriate beams. The router process 180 relays inbound messages from a HubClient 170 to the agent process 175 that is responsible for the sending transceiver's VPN.

Within the core network components, the messaging system 100 architecture can, for example, provide two interfaces for network client applications: the agent process API and the transceiver API. Both APIs consist of a command line interpreter (CLI) and a specific command set that operates in a fashion similar to a traditional DOS command prompt. The client can execute appropriate commands to accomplish tasks (such as sending a message to another network client).

Each agent process 175 on the packet switch 135 provides an agent process API, which is designed to support a customer's central or ground-based applications (agent clients 140). Agent clients 140 operate from outside the messaging system 100 network—typically on a customer's private system platform. The agent processes usually connect to the agent API using TCP/IP over the Internet (or other dedicated circuit). The agent client 140 can then use the API to receive GPS tracking data from transceivers and/or exchange messages with other network clients within the VPN.

In some implementations of the communication system, the miniaturized satellite transceiver 130 provides connection interface (e.g., Molex® interface available from Molex Incorporated) to connect to devices (e.g., a transceiver client 145). In those implementations, the device connected to the miniaturized satellite transceiver 130 has a complimentary connection interface, e.g., the transceiver has a male connection interface and the interfacing device has a female connection interface. In some implementations, a transceiver client 145 of the miniaturized satellite transceiver 130 is a PC, hand-held terminal, and/or a customized device.

Optionally, an interface card can be used as a bridge between a device and the miniaturized satellite transceiver 130. For example, in one implementation, the interface card has a RS-422 serial port and a female connection interface. The transceiver client 145 connects to the serial port and the female connection interface of the interface card is connected to a male connection interface on the miniaturized satellite transceiver 130. Thus the transceiver client 145 is connected to miniaturized satellite transceiver 130 via the interface card.

Where the miniaturized satellite transceiver 130 is incorporated into a mobile satellite transceiver system, the mobile satellite transceiver system includes an external RS-422 serial interface designed to connect to an external device (e.g., a transceiver client 145). In some implementations, a transceiver client 145 is a PC, hand-held terminal, and/or a customized device.

Once connected to the miniaturized satellite transceiver 130, the transceiver client 145 has access to the transceiver API command set. A transceiver client 145 can then use the miniaturized satellite transceiver 130 to exchange messages with agent clients 140 (or other transceivers 130) within the VPN. The transceiver client 145 also retrieves the current GPS location of the miniaturized satellite transceiver 130. The transceiver API allows, for an example, a transceiver client 145 to control a number of functions and settings of the miniaturized satellite transceiver 130, including, but not limited to, digital I/O, power management, and emergency mode operation.

The overall messaging system 100 architecture includes network client components (applications and devices) that use the network. In some implementations, however, network clients are considered peripheral to the core network architecture because client application development and operations is conceptually the domain of the customer or an external technology partner. Client applications generally fall into either of two categories: agent clients 140 or transceiver clients 145.

Agent clients 140 are users or applications that connect to the messaging system 100 network using the agent API. This normally involves a TCP/IP connection over the Internet, dedicated circuit, and/or dial-up connection. Once connected, the agent client 140 has full access to the agent API command set. In most agent client 140 scenarios, the interaction with the API is performed by software—either by an automated process, or by a translation layer that acts on behalf of a human user. However, it is possible for a user to engage the API directly using a utility such as TELNET. The primary purpose of most agent clients 140 is to exchange messages with transceivers 130 and/or track their locations.

It is customary for an agent client 140 to assume the identity of a pre-defined network node while connected to the network, thus allowing it to receive the messages addressed to the node. This technique, combined with proper configuration of the miniaturized satellite transceiver 130 and an appropriate node addressing scheme, allows an agent client 140 to act as a central point of communication or data collection for certain network applications. Since an agent process 175 can handle multiple simultaneous agent clients 140, it is possible to design agent clients 140 with specific, dedicated roles within the network application scheme.

Since agent clients 140 typically connect to the messaging system 100 over the Internet, the connection is likely to support a much higher communication bandwidth than the transceiver/satellite linkage. Agent clients 140 have a better potential for maintaining a continuous, long-term connection with the network. These factors tend to concentrate higher-traffic application roles (such as central dispatch or GPS location tracking) to the realm of agent clients 140 rather than transceiver clients 145.

Transceiver clients 145 are users or applications that connect to the messaging system 100 network through the miniaturized satellite transceiver 130, using the transceiver API. Once connected, the transceiver client 145 has full access to the transceiver API command set.

In many implementations, the miniaturized satellite transceiver's 130 operating system operates autonomously to control the operation of the GPS receiver and the satellite modem. This allows the miniaturized satellite transceiver 130 to maintain a communications lock on the satellite and to accept messages from the messaging system 100 network. The miniaturized satellite transceiver 130 can, for example, be configured to periodically report its GPS location and general status to the packet switch 135. The operating system can, for example, include a command-line interface and command set that serves as the API for an attached transceiver client 145.

In most transceiver client 145 scenarios, the interaction with the API is performed by software—either by an automated process, or by a translation layer that acts on behalf of a human user. However, it is possible for a user to engage the API directly using commonly available terminal emulation utilities such as PC-Plus, HyperTerminal, etc. The primary purpose of most transceiver clients 145 is to exchange messages with other network clients (e.g., miniaturized satellite transceivers 130 or agent clients 140) and/or determine its own current location (or that of other individuals and/or vehicles incorporating miniaturized satellite transceivers 130). The nature of the satellite communication linkage (with respect to both speed and transience), limits a transceiver client's practical ability to handle central application roles that require significant data volume or bandwidth. This inherent limitation is somewhat lessened for fixed-remote transceiver applications (since they are usually able to maintain a constant lock on the satellite).

In some implementations, the miniaturized satellite transceiver 130 also has text messaging capabilities. The messaging system 100 is designed to transport short message packets between network clients. A network client can be either an agent client 140 connected to the packet switch 135, or a transceiver 130 (used in a mobile or fixed-remote application). The messaging system 100 messages are somewhat analogous (though distinctly different as explained below) to email messages in the following respects: The user (or client application) provides message content (known as payload). Messages are routed and delivered to the destination asynchronously—usually within a few seconds. There is no guarantee that the intended recipient is presently available to read the message. It is possible to request confirmation of delivery from the receiving party. The message (as a whole) includes standard header information used for network routing. Message content is typically represented in printable ASCII text. Binary content must be encoded as printable ASCII text in the form of Hexadecimal pairs. However, messaging system 100 messages differ from email in the following ways: message payload (the carrying capacity available for text or application data) is limited to 100-110 bytes. Messages are addressed to other messaging system 100 network members using a proprietary addressing scheme (rather than a traditional email address). Messages must be addressed to a single destination node. There is typically no explicit 'CC' capability, though multicasting and broadcasting capabilities are available in some implementations. The messaging system 100 message transport mechanism is ideal for applications that must exchange short, independent data packets on a relatively infrequent basis.

FIG. 2A and FIG. 2B depict a miniaturized satellite transceiver 230 used in some implementations of the systems of FIGS. 1A and 1B. FIG. 2A depicts the top view of the miniaturized satellite transceiver 230 and FIG. 2B depicts the bottom view. As indicated in FIG. 2B, inputs are available for an external GPS fill 211 (if GPS capabilities beyond the commercial-grade on-board GPS be desired), as well as connectors for Left-Hand Circular 212a and Right-Hand Circular 212b polarized connections from antennas in signal communication with the miniaturized satellite transceiver 230. The miniaturized satellite transceiver 230 includes a connector interface 210 (e.g., Molex® interface available from Molex Incorporated) to connect to devices (e.g., a transceiver client), a power module 216 for providing power to the miniaturized satellite transceiver 230, a processor 220 for processing the inputs and outputs to the miniaturized satellite transceiver 230, a storage module 222 for storing location information, text, an operating system for controlling the operations of the GPS receiver and the satellite modem, and other information associated with the miniaturized satellite transceiver 230, a GPS receiver 224, a field programming gate array (FPGA) processor 225 for controlling inputs and outputs of a satellite modem 226, and the satellite modem 226. The connector interface 210 includes a serial interface 214 for diagnostic and testing uses and a power input block 215 for providing power to the miniaturized satellite transceiver 230.

The processor 220 can be, for example an ARM processor available from ARM Limited. In some examples, the processor 220 provides an application programming interface (API) for access to the functions of the processor 220 including the processing of the inputs and outputs to the miniaturized satellite transceiver 230. In other examples, the processor 220 provides a scheduler which provides for scheduling of the inputs and outputs to the miniaturized satellite transceiver 230. The FPGA processor 225 can control, for example, the sensitivity of the satellite modem 226 and/or delivery of data to the satellite. In some examples, the FPGA processor 225 encodes and decodes the packets received and transmitted, respectively, through the satellite modem 226.

One implementation of the miniaturized satellite transceiver 130 has the following specifications. The miniaturized satellite transceiver's size is approximately two inches wide by four inches (4") deep by six tenths of an inch (0.6") tall (i.e., 2"×4"×0.6"). It weighs approximately three-tenths of a pound ($3/10^{th}$ lb.) and has an operating temperature of −40° C. to +65° C. The main interface to the unit is a 3.3 volt TTL serial port and the unit requires 6.5-15 volts of direct current ("vdc"). The miniaturized satellite transceiver 130 uses 0.15 amps at 10 vdc during receiving operations and 3.0 amps at 10 vdc while transmitting. The transmit frequencies used are 1610.0 to 1660.5 MHz and receive frequencies are between 1525.0 and 1559 MHz and are transmitted between 0.04 Watts and 4 Watts. This implementation of the miniaturized satellite transceiver 130 has a GPS unit installed as well as a 50 ohm external feed antenna, which accepts Left-Hand-Circular ("LHC") and Right-Hand-Circular ("RHC") polarization feeds. Further, the implementation is compatible with the application programming interface ("API") of the MT-2011 transceiver produced by Comtech Mobile Datacom Corporation (of Germantown, Md.). Further, the miniaturized satellite transceiver 130 is capable of communicating at data rates between 660 bits per second ("bps") and about 21,000 bps and with a power supply as low as 6.5 vdc.

In some implementations, the miniaturized satellite transceiver 130 is installed in a handheld device or is accessed via an interface card by a handheld device. Beneficially, though, because of its small size and standard interfaces, the miniaturized satellite transceiver 130 is, in some implementations, incorporated into communications systems attached to vehicles. For example, as a mobile satellite transceiver system attached to a cargo transport such as a truck or train may incorporate the miniaturized satellite transceiver 130, or alternatively, the miniaturized satellite transceiver is incorporated into an in-flight transceiver and locator system housed in an aircraft such as a helicopter or airplane. Typically these systems provide additional functionality for use in conjunction with the miniaturized satellite transceiver 130 such as RFID interrogators, military-grade GPS. Advantageously, the miniaturized satellite transceiver provides commercial-grade GPS reception, satellite communications, and status, location, etc., reporting for the vehicle.

Many implementations of the miniaturized satellite transceiver 130 provide the following capabilities and advantages: an L-Band satellite modem that operate over MSAT, INMARSAT, Thuraya, Artemis, ACeS, and OPTUS L-Band systems, a commercial-grade GPS receiver, on-board processor and operating system, RS-422 Serial interface and/or a connection interface to connect to for external devices, API command set to serve a user or client application from an attached peripheral device, emergency alert mode, ability to automatically detect and tune to appropriate satellite communication frequency (known as World Wide Autonomy or WWA), 'over-the-air' configuration capability (known as remote provisioning), auxiliary power supply for external devices, and/or power management features.

In some implementations (where the miniaturized satellite transceiver 130 is incorporated into a mobile satellite transceiver system), the operating system is configured to meet the interface requirements of the Gen III RF interrogator board (available from Savi Technology of Sunnyvale, Calif.) and/or a GRAM SAASM board (including health and diagnostic capabilities for both). Interrogator capabilities include determining an RFID tag's identity information, e.g., tag number, received signal strength indicator, battery status code and/or the tag's header data (e.g., tag number, Transportation Control Number ("TCN"), Consignee DODAAC and/or Commodity Class). Interrogator requests can occur at defined intervals or on-demand from a control station 110. Interrogation can, for example, be turned on and off on an as-needed basis. In some examples, messages sent can include a bumper number (e.g., a unit ID or a combat ID), a grid location, date and time, manual inputs for RFID tags, and/or tag reading malfunction. Some implementations of the transceiver 130 are configured to cause RFID tags to emit audible beeps.

In some examples, the miniaturized satellite transceiver 130 supports "virtual LEDs" or status indicators that are changed and/or set by software to indicate an established satellite link, indication of data transmission and/or reception, and/or other statuses. The mobile satellite transceiver system and the miniaturized satellite transceiver 130 can, for example, utilize an external cryptographic device to "fill" the cryptographic keys used during communications. The external cryptographic device is typically connected via a RS 422 serial connector (or via an interface card for the miniaturized satellite transceiver 130).

In addition to incorporation into a mobile satellite transceiver system for use on trucks or trains, the miniaturized satellite transceiver 130 can alternatively be incorporated into an in-flight transceiver and locator system in aircraft vehicles such as helicopters and/or airplanes. Beneficially, the miniaturized satellite transceiver's small form factor and low weight are ideal for aircraft platforms due to the limitation of space on the aircraft and the need to minimize the aircraft's total weight.

Figure 4:
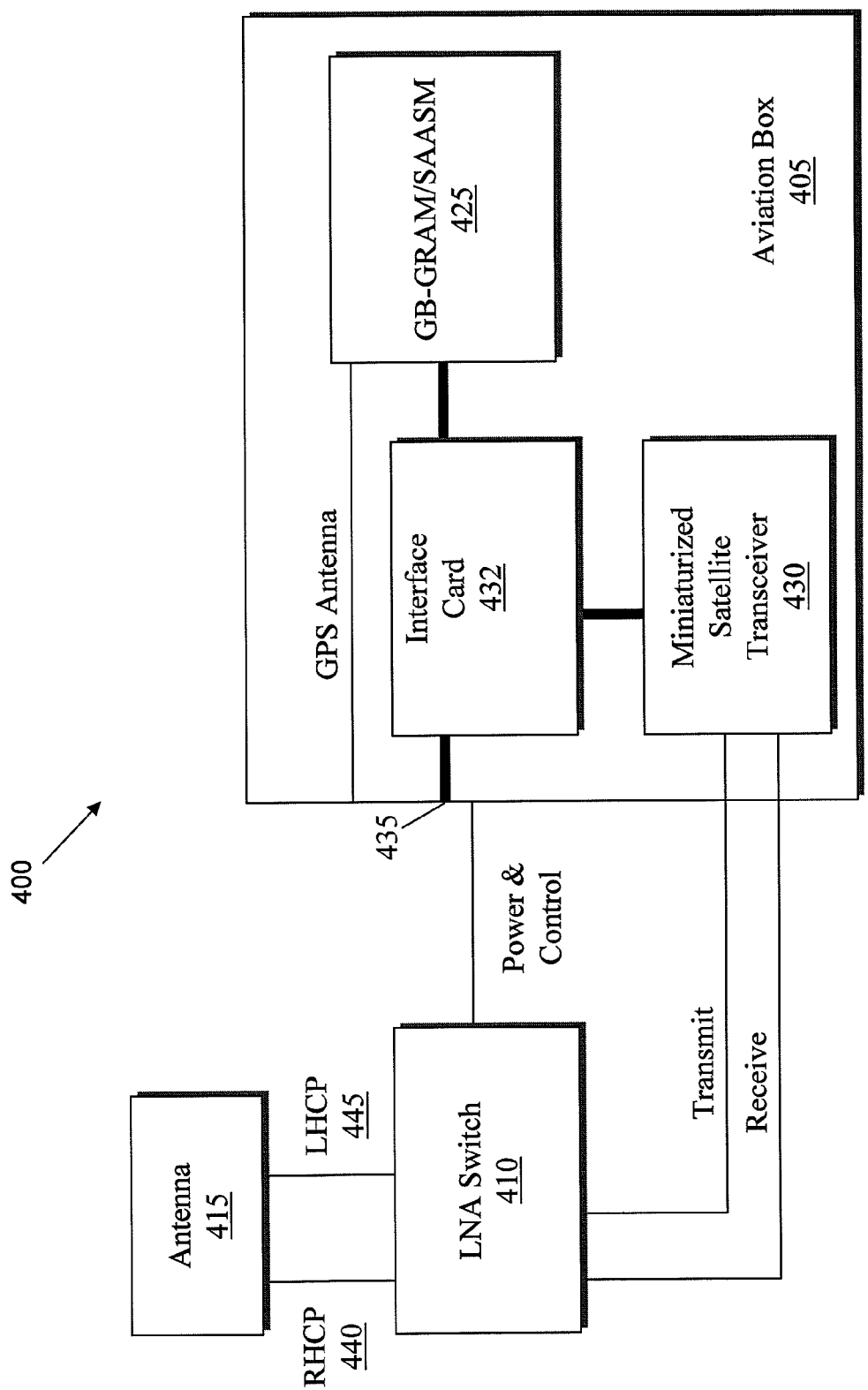
FIG. 4 depicts an implementation where the miniaturized satellite transceiver is incorporated into an in-flight transceiver and locator system.

FIG. 4 depicts an implementation where the miniaturized satellite transceiver 430 is incorporated into an in-flight transceiver and locator system 400 ("in-flight transceiver system"). The in-flight transceiver system 400 includes an aviation box 405, a low noise amplifier ("LNA") 410 or signal booster switch, and an antenna 415, all in signal communication. In some implementations the in-flight system uses two antennas rather than one. The aviation box 405, contains a miniaturized satellite transceiver 430, a GB-GRAM/SAASM unit 425 and an optionally an interface card 432.

Typically the aviation box 405 resides inside the aircraft, e.g., a helicopter. The antennas 415 typically reside on the exterior of the aircraft. For the aviation box 405 to fit into a small form factor, e.g., one-half short ATR (approximately six (6) inches), the antenna 415 is located outside of the aviation box 405 as well as the aircraft. In some embodiments, the antenna 415 is located not less than 15 feet from the aviation box 405. In some embodiments, the antenna 415 is located not less than thirty feet from the aviation box 405. Beneficially, the LNA switch 410 boosts the signal between the antenna 415 and the aviation box 405, overcoming the signal loss in the cable connecting the aviation box 405 to the antenna 415. In some examples, the aviation box incorporates a miniaturized satellite transceiver 430. In other examples, the antenna 415 fits the aerodynamic requirements of the aircraft. The benefit is that robust communications and miniaturized satellite transceiver 430 functionality (with built-in GPS capabilities) can be provided in a form factor that fits easily within an aircraft where space is at a premium and additional weight is discouraged.

The aircraft is able to communicate securely with ground units, base stations and other aircraft via the in-flight transceiver system 400. The aircraft is signally connected to a data interface 435 located on the exterior of the aviation box 405. The data from the aircraft is sent via a port 435, via the interface card 430 to the miniaturized satellite transceiver 430 and/or GB-GRAM/SAASM unit 425. The data is then communicated from the aviation box 405 through the LNA switch 410 to the antenna 415 located on the exterior of the aircraft. From the antenna 415, data is communicated to a communications and/or GPS satellite. When receiving information the reverse occurs: data is received at the antenna 415, passes through the LNA 410 where the signal is amplified, the signal is received by the miniaturized satellite transceiver 430, is communicated to the interface card 432 and/or GB-GRAM/SAASM unit 425, and transmitted via a port 435 on the exterior of the aviation box 405 to the aircraft. The in-flight transceiver system 400 sends communication over a standard L-Band satellite communication channel to communicate with a satellite as described above.

In other examples, the in-flight transceiver system 400 is operable under various aviation environmental conditions, such as vibration, salt fog, varying temperatures, e.g., between minus twenty-six (−26) degrees Centigrade and plus seventy-one (+71) degrees Centigrade, aircraft voltage transients, altitude, air pressure, blowing dust and sand, solar radiation, fungus, rain, blowing rain, freezing rain, transit drop, explosive atmosphere, radiated, external electromagnetic forces, and/or conducted emissions.

In a preferred implementation, the antenna 415 is a fin-shaped antenna that preferably resides on the exterior of the aircraft. In some implementations, the antenna 415 is a dual-pole antenna and includes a right hand circularly polarized (RHCP) antenna 440 and a left hand circularly polarized (LHCP) antenna 445. This allows the antenna 415 to tune communications sent using either signal polarization. In some implementations, one antenna 415 can be adjusted to act as a RHCP antenna 440 or a LHCP antenna 445. If there is only one antenna 415, a switch can, for example, be used to determine the direction of the polarization. In one embodiment, the LNA switch 410 can be used to determine the polarization of the antenna. In other examples, the antenna 415 has omni-directional capabilities so that the antenna can receive communications originating from any direction and not just communications specifically aimed at the antenna 415.

In some implementations, the LNA switch 410 is connected to the antenna(s) 415 and boosts the signal received by the antenna(s) 415 when forwarding the antenna's signal to the aviation box 405. Boosting the signal allows the antenna(s) 415 to have a wire between the antenna(s) 415 and the aviation box 405 that is longer in length than is achievable for a connection without a signal boosting LNA 410. Optionally, the LNA switch 410 controls signal traffic between the antenna 415 and the aviation box 405. For example, the LNA switch 410 advantageously instructs the receiver in the miniaturized satellite transceiver 430 to cease receiving while the transmitter in the miniaturized satellite transceiver 430 is transmitting. In addition to being connected to the antenna 415, the LNA switch 410 is also connected to the aviation box 405 via transmit and receive connections. In some implementations the connections are a single cable, e.g., a serial connection, a copper wire, or the like. In these implementations typically a control signal instructs the LNA 410 if a transmit or receive command is being sent from the miniaturized satellite transceiver 430 to the LNA switch 410. In a preferred implementation, however, the transmit and receive connections between the LNA switch 410 and the aviation box 405 are separate connections. Regardless of single or dual connections, a control signal can also be provided to the LNA switch 410 by the aviation box 405 if RHCP or LHCP is to be used when sending or receiving a transmission. Additionally the aviation box 405 includes a power and control line connected to the LNA switch 405. Typically electrical power provided by aircrafts undergoes dips and surges. Beneficially power to the LNA box 410, miniaturized satellite transceiver 130 and/or the GB-GRAM/SAASM unit 425 can be conditioned by the interface card 432 within the aviation box 405 to prevent power surges or dips from damaging the circuitry of the respective components.

The interface card 432 in the aviation box 405 provides several connections for the in-flight transceiver system 400. In some versions the interface card 432 provides connections between the miniaturized satellite transceiver 430, ports 435 on the exterior of the aviation box 405, and the GB-GRAM/SAASM 425 using wiring harnesses with latching connectors. Additionally, the interface card 430 provides serial interface converters to convert from serial connections found on the exterior of the aviation box 405 to bus connections with the miniaturized satellite transceiver 430 and GB-GRAM/SAASM 425. In some implementations, the interface card 430 receives power via a connection 435 on the exterior of the aviation box 405 from the aircraft and provides power supply conditioning of approximately an input range of about +10 to about +32 VDC for the other components of the in-flight transceiver system 400 such as the miniaturized satellite transceiver 430 and LNA switch 410. In some embodiments, power conditioning for the miniaturized satellite transceiver 430 involves a step-down conversion to +12 VDC. The power supplied to the LNA switch 410 is a step down conversion to about +8 VDC.

In one implementation, the aviation box has an RS-422 interface and a RS-232 interface on the exterior of the aviation box (optionally connected to the interface card 430). The RS-422 interface is useful for connecting the aviation box 405 to communication systems, computers (e.g., Force XXI Battle Command, Brigade-and-Below (FBCB2) computers, and/or navigation systems of the aircraft). The RS-232 interface is useful for connecting a laptop computer as a diagnostic tool to the aviation box 405. In some implementations, the aviation box 405 can have an auto-detect feature that recognizes if connections are made to either the RS-422 interface or the RS-232 interface. In some versions, the auto-detect functionality disregards connections to one of the serial connections other based on software logic executing on a processor typically associated with the miniaturized satellite transceiver 430 within the aviation box 405. In one implementation, the auto-detect feature of the software logic instructs the aviation box 405 to ignore commands from the RS-422 interface if a laptop or diagnostic tool is connected to the RS-232 interface. In another implementation, the software logic will instruct the aviation box 405 to multiplex between the RS-232 interface and the RS-422 interface.

In some implementations, the aviation box 405 also provides connections 435 on the exterior of the aviation box 405, via the interface card 430, for external capabilities to provide enhanced functionality. In some implementations, there is an interface that accepts a cryptographic "fill" wherein secure cryptographic keys and/or data are provided to the aviation box 405 for encrypting/decrypting and/or encoding/decoding transmissions. In some implementations, there is an interface that accepts external GPS data and/or functionality. For example, in some versions, the GB-GRAM/SAASM 425 unit additionally provides anti-spoofing capabilities to the commercial-level accuracy built into the GPS of the miniaturized satellite transceiver 130 (e.g., accurate location information within thirty to one hundred meters). In some implementations, WAAS and/or military-grade GPS data/functionality can be supplied to the aviation box via a connector 435 on the exterior of the aviation box 405. WAAS and/or military-grade GPS is accurate within three meters. In some implementations, external GPS is unnecessary because the GPS capabilities built into the miniaturized satellite transceiver 130 provides WAAS-level accuracy.

In some embodiments, the miniaturized satellite transceiver 430 utilizes a dedicated external GPS antenna interface provided via the exterior ports 435 of the aviation box 405. The miniaturized satellite transceiver 430 interfaces to the GB-GRAM/SAASM unit 425 internal to the aviation box 405, via the interface card 430, using a GPS serial connection. In some versions, the GB-GRAM/SAASM unit 425 provides a dedicated cryptographic key port on the exterior of the aviation box 405 for cryptographic fills. In some implementations, the miniaturized satellite transceiver 430 provides position reporting via FBCB2 messages.

In some examples, the miniaturized satellite transceiver 430 of the aviation box 405 sends/receives text messages, location data, maps, photos, video, task orders, targeting data, computer programs, software, cryptographic keys, provisioning files, and/or other communications to/from the antenna 415. In other examples, the miniaturized satellite transceiver 430 is assigned unique radio identifier. In some versions, a customizable node name is associated with and/or assigned to the unique radio identifier for easy reference by computers (e.g., the aircraft's computers or computers at a ground station) or by humans, either operators of the aircraft the in-flight transceiver system 400 is located in or by units and/or ground stations communicating with the aircraft.

In other examples, the miniaturized satellite transceiver 430 switches to Voice over Blue Force Tracking (voice over packet) upon initiation and/or detection of voice traffic. Upon completion of the voice communication, the transceiver switches back to general Blue Force Tracking mode. In some examples, a processor (not shown) for the miniaturized satellite transceiver 430 processes commands from the GB-GRAM/SAASM unit 425 Application Programming Interface (API). The miniaturized satellite transceiver 430 beneficially allows communications systems, computers (e.g., FBCB2 computers) and navigation systems of the aircraft to utilize and/or provide commands to the transceiver (e.g., acting as a data modem, to communicate with satellites, other in-flight and/or ground units, and/or base stations).

In other examples, the aviation box 405 has three light-emitting diode (LED) lights on the exterior of the box 405. A first LED indicates when the aviation box 405 has a connected power supply. The second LED indicates when the miniaturized satellite transceiver 430 has locked onto a satellite. The third LED indicates when the miniaturized satellite transceiver 430 is transmitting. In other examples, LED lights are additionally located remotely from the aviation box 405. In these embodiments, the LED lights are mounted or positioned on the dashboard of the cockpit or flight area, and the aviation box 405 is located in another part of the aircraft. Typically a cable harness connects the aviation box 405 and the LED lights.

Figure 5:
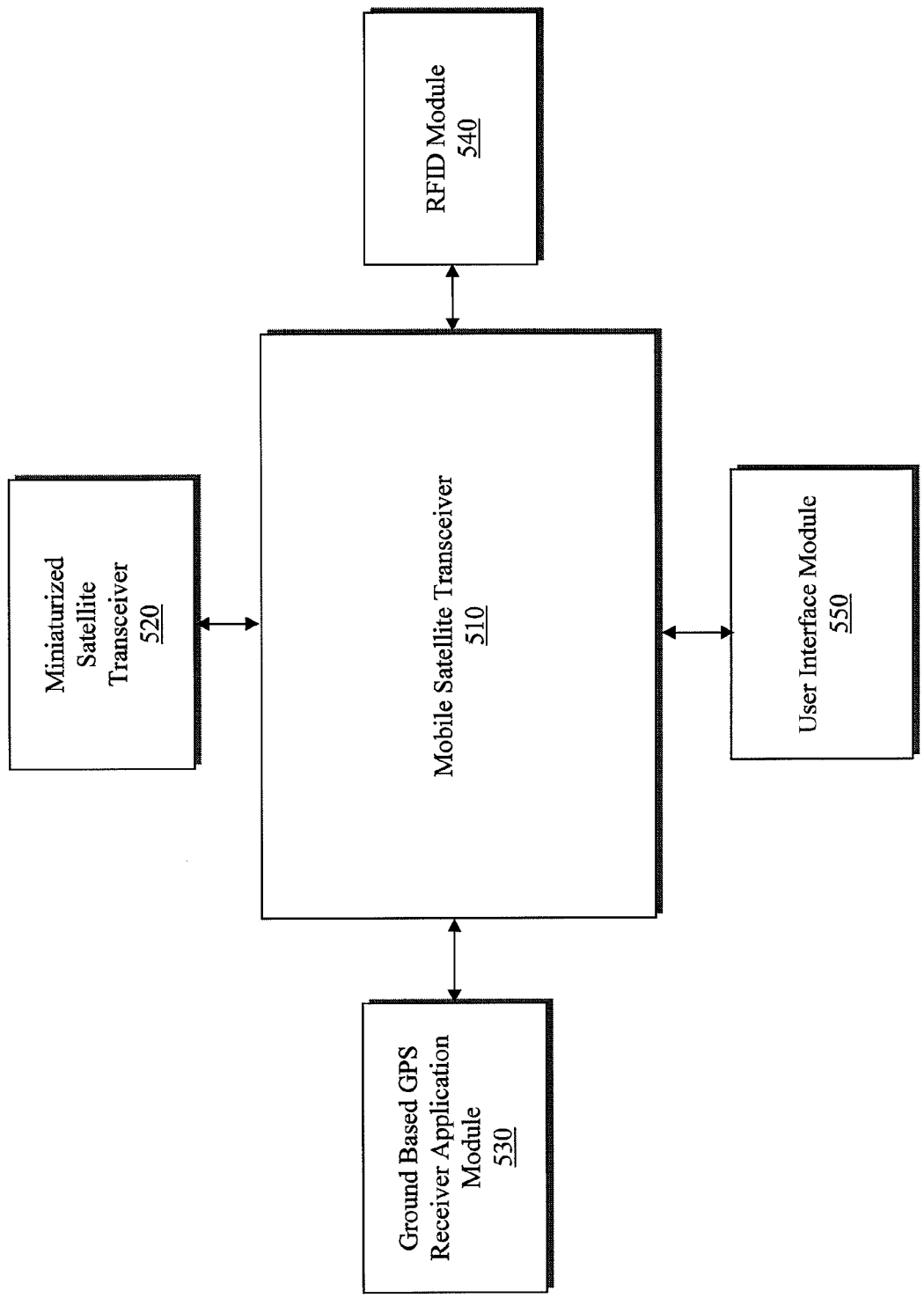
FIG. 5 depicts an implementation where the miniaturized satellite transceiver is utilized with a mobile satellite transceiver.

FIG. 5 depicts an implementation where the miniaturized satellite transceiver 520 is utilized with a mobile satellite transceiver 510. The exemplary system 500 includes the mobile satellite transceiver 510, the miniaturized satellite transceiver 520, a ground-based GPS receiver application module (GB-GRAM) 530, a RFID module 540, and a user interface module 550. The mobile satellite transceiver 510 communicates with the miniaturized satellite transceiver 520, the GB-GRAM 530, and the RFID module 540 to provide for communication with an Earth station via a communications satellite. The user interface module 550 provides an interface for a user to access the mobile satellite system 500.

For example, a mobile satellite transceiver system 500 that incorporates the miniaturized satellite transceiver 520 is usually attached to a vehicle and includes a housing that contains the miniaturized satellite transceiver 520 and other modular components (e.g., GB-GRAM 530, RFID module 540). For example, even though the miniaturized satellite transceiver 520 provides commercial-grade GPS functionality, some implementations, however, utilize a separate, military-grade GPS component to provide greater GPS accuracy. An example of such a module is a GB-GRAM 530 (with corresponding antennas) and/or a Selective Availability Anti-Spoofing Module (SAASM) (described below). Beneficially, the miniaturized satellite transceiver's satellite modem acts as the satellite modem for the mobile satellite transceiver system for communicating the more accurate GPS coordinates back to an Earth station via the communications satellite.

Military-grade GPS is beneficial in that SAASM-capable receivers can directly acquire military P(Y) code signals from a GPS satellite 120 in FIG. 1. The P(Y) code has more robust anti-jamming defenses than a civilian code (which any individual can access with a commercial receiver). Being SAASM-capable does not provide jamming immunity; rather it enables access to the more secure military P(Y) code. SAASM-enabled receivers can also acquire encrypted Y-code directly from satellite, without relying on local radio signals. SAASM allows for satellite authentication, over-the-air rekeying, and contingency recovery, features typically available with the similar, but older PPS-SM system. SAASM-enable receivers also allow for updating with an encrypted "Black Key" that can be transmitted over unclassified channels.

In some implementations, a mobile satellite transceiver system 500 that incorporates a miniaturized satellite transceiver 520 provides a RFID module 540. The RFID module 540 can be, for example, a RFID transceiver/interrogator component for RFID interrogator capabilities. The RFID interrogator component is used to transmit a signal requesting a response from RFID receivers ("tags") nearby. RFID tags located nearby (e.g., under ten meters), receive the signal and respond with a self-identifying signal. The RFID tags used in conjunction with the RFID interrogator can be passive, semi-passive, or active. In some examples, passive RFID tags have no internal power supply and instead receive any necessary power from the RFID interrogator signal. In other examples, semi-passive RFIDs tags contain a battery and remain constantly powered. Semi-passive RFIDs typically can respond to an interrogation signal faster than a passive RFID tag. In some examples, active RFID tags transmit a self-identifying signal periodically and do not wait for the RFID interrogator signal.

The RFID interrogator can, for example, receive response signals from the RFID tags and report the results via the miniaturized satellite transceiver to headquarters. The status reports allow headquarters to determine that the location and cargo sent from the warehouse or loading point matches the expected cargo at that particular point. For example: A transport truck left headquarters with boxes X, Y, and Z, each having an RFID tag. En route, the RFID transceiver transmits an interrogator signal. The RFID tags on each box responds. A first status report and a location indicator are sent, via the transceiver, to headquarters. Based on the received status report, headquarters knows that boxes X, Y, and Z are en route to the destination. After the first status report is sent to headquarters, box Y is dropped off at military base alpha. En route to military base beta, the RFID transceiver transmits a second interrogation signal. Boxes X and Z respond. Box Y does not reply because box Y was dropped off is out of range of the interrogation signal. Based on the second status report that is sent to headquarters, headquarters determines that box Y is no longer on the transport truck Headquarters can, for example, receive a report from military base alpha through other RFID means that box Y was dropped off.

Advantageously, combinations of the above configurations are provided, e.g., a mobile satellite transceiver system 500 that utilizes the commercial-grade GPS of the miniaturized satellite transceiver 520, a mobile satellite transceiver system 500 with commercial-grade GPS and RFID capabilities, a mobile satellite transceiver system 500 providing GB-GRAM and/or SAASM alone with no RFID capabilities, and a mobile satellite transceiver system 500 with GB-GRAM/SAASM and RFID capabilities. Some implementations additionally provide a memory buffer of at least 512 kilobytes (e.g., 512 kilobyte, 1024 kilobyte, 10 megabyte) to accept large data dumps for packetized transmission over the satellite communications link.

In other examples, the mobile satellite system 500 includes an operating system for controlling one or more operations of the mobile satellite transceiver 510 and for communicating with the miniaturized satellite transceiver 520. The operating system in the mobile satellite system 500 can communicate, for example, with the GB-GRAM module 530 and/or the RFID module. The operating system in the mobile satellite system 500 can utilize, for example, the user interface module 550 to interact with a user. In some examples, the miniaturized satellite transceiver 520 includes a GPS receiver for receiving communications from a GPS satellite, a satellite modem for transmitting and receiving communications from a communications satellite, and an operating system for controlling one or more operations of the GPS satellite and the satellite modem and for communicating with the mobile satellite transceiver 510.

One implementation of a mobile satellite transceiver system 500 that incorporates the miniaturized satellite transceiver 520 has the following specifications. The mobile satellite transceiver systems's size is approximately eight inches wide by eight inches deep by five inches tall (i.e., 8"×8"×5"). It weighs approximately 11 lbs and has an operating temperature of −40° C. to +65° C. This implementation of the mobile satellite transceiver system is 100% humidity and highly water resistant and operates at altitudes of 0 to 25,000 feet. The main interface to the unit is a RS-422 serial port (military-style connector) and the unit requires 10-32 volts of direct current ("vdc"). Power is supplied through a 12 vdc input and the mobile satellite transceiver 510 uses 0.35 amps during receiving operations, 3.0 amps (for <400 msec/message) while transmitting. The transmit frequencies used are 1610.0 to 1660.5 MHz and receive frequencies are between 1525.0 and 1559 MHz and are transmitted at under five watts. The mobile satellite transceiver system 500 includes a miniaturized transceiver 520 that operates as a satellite modem, where modulation used by the mobile satellite transceiver system 500 is direct sequence spread spectrum and antennas for five different bands are incorporated into the housing. Further, the implementation is compatible with the application programming interface ("API") of the MT-2011 transceiver produced by Comtech Mobile Datacom Corporation (of Germantown, Md.).

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in many forms of programming language, including compiled and/or interpreted languages, and the computer program can be deployed in many forms, including as a stand-alone program or as a subroutine, element, and/or other unit suitable for use in a computing environment. A computer program can be deployed to be executed on one computer or on multiple computers at one site.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD- ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The components of the system can be interconnected by any form or medium of digital data communication (e.g., a communication network). Examples of communication networks include a local area network (LAN), a wide area network (WAN), the Internet, wired networks, wireless networks, packet-based networks, and/or circuit-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A miniaturized satellite transceiver for communicating with a Global Positioning System (GPS) satellite and a communications satellite comprising:
    a GPS receiver configured to receive communications from the GPS satellite;
    a satellite modem configured to transmit and receive communications from the communications satellite;
    an operating system for controlling an operation of the GPS receiver and the satellite modem; and
    a serial interface for communicating with a transceiver client, the transceiver client controlling an operation of the miniaturized satellite transceiver,
    wherein the operating system is configured to send a text message to and receive a text message from the communications satellite via the satellite modem, and
    wherein the text message comprises RFID data, the RFID data comprising an RFID tag identity.

2. The miniaturized satellite transceiver of claim 1 wherein the miniaturized satellite transceiver is configured to be installed in a handheld device.

3. The miniaturized satellite transceiver of claim 1 wherein the communications from the communications satellite are transmitted and received using an L-Band communications channel.

4. The miniaturized satellite transceiver of claim 3 wherein the L-Band communications channel comprises MSAT, INMARSAT, Thuraya, Artemis, ACeS, OPTUS, or combinations thereof.

5. The miniaturized satellite transceiver of claim 1 further comprising a left-hand circular polarized antenna connection and a right-hand circular polarized antenna connection.

6. The miniaturized satellite transceiver of claim 1 wherein the communications transmitted and received via the satellite modem are encrypted using a Triple Data Encryption Standard (DES) algorithm, an Advanced Encryption Standard (AES) algorithm, a Rivest Shamir Adleman (RSA) algorithm, or combinations thereof.

7. The miniaturized satellite transceiver of claim 1 wherein the communications transmitted and received via the satellite modem are sent over a Blue Force tracking network.

8. The miniaturized satellite transceiver of claim 7 wherein the communications sent over the Blue Force Tracking network comprise voice over packet communications.

9. The miniaturized satellite transceiver of claim 8 wherein the voice over packet communications are sent over a dedicated satellite channel.

10. A method for communicating between a transport unit and an Earth station via a communications satellite comprising:
    providing a miniaturized satellite transceiver comprising:
        a Global Positioning System (GPS) receiver receiving communications from a GPS satellite,
        a satellite modem transmitting and receiving communications from the communications satellite,
        an operating system controlling an operation of the GPS receiver and the satellite modem, and
        a serial interface for communicating with a transceiver client, the transceiver client controlling an operation of the miniaturized satellite transceiver;
    creating, by the operating system, a communications transmission packet; and
    sending, by the satellite modem, the communications transmission packet to the Earth station via the communications satellite,
    wherein the communications transmission packet comprises RFID data, the RFID data comprising an RFID tag identity, including a tag number, a received signal strength indicator, a battery status code, and tag header data.

11. The method of claim 10 wherein the communications transmission packet comprises a location of the mobile satellite transceiver system based on received GPS coordinates, a text message, or combinations thereof.

12. The method of claim 10 wherein the communications transmission packet provides communications beyond-line-of-sight.

13. A mobile satellite transceiver system for communicating with a Global Positioning System (GPS) satellite and a communications satellite comprising:
    a miniaturized satellite transceiver comprising:
        (a) a GPS receiver configured to receive communications from the GPS satellite, (b) a satellite modem configured to transmit and receive communications from the communications satellite, and
(c) an operating system for controlling an operation of the GPS receiver and the satellite modem and communicating with the mobile satellite transceiver system; and
(d) a serial interface for communicating with a transceiver client, the transceiver client controlling an operation of the mobile satellite transceiver,
wherein the operating system is configured to send a text message to and receive a text message from the communications satellite via the satellite modem, and
wherein the text message comprises RFID data, the RFID data comprising an RFID tag identity.

14. The mobile satellite transceiver system of claim 13 wherein the operating system is configured to send and receive a text message to the communications satellite via the satellite modem of the miniaturized satellite transceiver.

15. The mobile satellite transceiver system of claim 13 further comprising at least a 512 kilobyte memory buffer.

16. The mobile satellite transceiver system of claim 13 wherein communications from the communications satellite are transmitted and received using an L-Band communications channel.

17. The mobile satellite transceiver system of claim 16 wherein the L-Band communications channel comprises MSAT, INMARSAT, Thuraya, Artemis, ACeS, OPTUS, or combinations thereof.

18. The mobile satellite transceiver system of claim 13 further comprising a Radio Frequency Identification (RFID) interrogator.

19. The mobile satellite transceiver system of claim 13 further comprising a Ground-Based GPS Receiver Application Module (GB-GRAM) with a Selective Availability Anti-Spoofing Module (SAASM).

20. An in-flight transceiver system for communicating information securely at a high data rate between an in-flight unit and a ground unit comprising:
an antenna;
a miniaturized satellite transceiver housed in an aviation box conforming to a one-half, half short Air Transport Rack (ATR) form factor, the miniaturized satellite transceiver comprising:
(a) a Global Positioning System (GPS) receiver configured to receive communications from a GPS satellite,
(b) a satellite modem configured to transmit and receive communications from a communications satellite,
(c) an operating system for controlling an operation of the GPS receiver and the satellite modem, and
(d) a serial interface for communicating with a transceiver client, the transceiver client controlling an operation of the miniaturized satellite transceiver; and
a switch between the aviation box and the antenna for controlling a data signal between the antenna and the miniaturized satellite transceiver.

21. The in-flight transceiver system of claim 20 further comprising a signal booster between the aviation box and the antenna.

22. The in-flight transceiver system of claim 20 wherein the antenna is located outside a body of an aviation platform and wherein the aviation box is located inside the body of the aviation platform.

23. The in-flight transceiver system of claim 20 wherein the antenna is fin-shaped.

24. The in-flight transceiver system of claim 20 wherein the antenna is a dual-pole antenna.

25. The in-flight transceiver system of claim 20 wherein the antenna is an omni-directional antenna.

26. The in-flight transceiver system of claim 20 wherein the information is communicated bidirectionally between the in-flight unit and the ground unit.

27. The in-flight transceiver system of claim 20 wherein the information is a packet encrypted using a Triple Data Encryption Standard (DES) algorithm, an Advanced Encryption Standards (AES) algorithm, a Rivest Shamir Adleman (RSA) algorithm, or combinations thereof.

28. The in-flight transceiver system of claim 20 wherein the information is transmitted over an L-Band satellite communication channel.

29. The in-flight transceiver system of claim 20 wherein the miniaturized satellite transceiver is Blue Force Tracking-capable.

30. The in-flight transceiver system of claim 20 wherein the miniaturized satellite transceiver is operable to send and receive voice over packet transmissions.

31. The in-flight transceiver system of claim 20 wherein the miniaturized satellite transceiver is assigned unique radio identifier.

32. The in-flight transceiver system of claim 31 wherein a customizable node name is associated with the unique radio identifier.

33. The in-flight transceiver system of claim 20 wherein the information is communicated beyond-line-of-sight.

34. A miniaturized satellite transceiver for communicating with a Global Positioning System (GPS) satellite and a communications satellite comprising:
a GPS receiver configured to receive communications from the GPS satellite;
a satellite modem configured to transmit and receive communications from the communications satellite;
an operating system for controlling an operation of the GPS receiver and the satellite modem; and
a serial interface for communicating with a transceiver client, the transceiver client controlling an operation of the miniaturized satellite transceiver;
wherein the communications transmitted and received by the satellite modem comprises GPS coordinates and a text message, and
wherein the text message comprises RFID data, the RFID data comprising an RFID tag identity.

35. A miniaturized satellite transceiver for communicating with a Global Positioning System (GPS) satellite and a communications satellite comprising:
means for receiving communications from the GPS satellite;
means for transmitting and receiving communications from the communications satellite, wherein the communications transmitted and received from the communications satellite comprises GPS coordinates and a text message, and wherein the text message comprises RFID data, the RFID data comprising an RFID tag identity;
means for controlling an operation of the GPS receiver and the satellite modem; and
means for communicating with a transceiver client, the transceiver client controlling an operation of the miniaturized satellite transceiver.

* * * * *